(12) United States Patent
Gnekow

(10) Patent No.: US 9,879,209 B2
(45) Date of Patent: Jan. 30, 2018

(54) VERTICAL PALATE WINE MAKING PROCESS

(71) Applicant: Barry Gnekow, San Francisco, CA (US)

(72) Inventor: Barry Gnekow, San Francisco, CA (US)

(*) Notice: Subject to any disclaimer, the term of this patent is extended or adjusted under 35 U.S.C. 154(b) by 380 days.

(21) Appl. No.: 14/496,513

(22) Filed: Sep. 25, 2014

(65) Prior Publication Data

US 2015/0086674 A1  Mar. 26, 2015

Related U.S. Application Data

(60) Provisional application No. 61/882,935, filed on Sep. 26, 2013.

(51) Int. Cl.
*C12G 1/00* (2006.01)
*C12G 1/02* (2006.01)

(52) U.S. Cl.
CPC ............ *C12G 1/00* (2013.01); *C12G 1/02* (2013.01); *C12G 2200/21* (2013.01)

(58) Field of Classification Search
CPC ... C12G 1/00; C12G 1/02; C12G 1/06; C12G 3/04; C12G 3/06; C12G 3/08; C12G 3/02; C12G 1/021
(Continued)

(56) References Cited

U.S. PATENT DOCUMENTS 4,888,189 A   12/1989 Gnekow
4,999,209 A   3/1991 Gnekow
(Continued)

FOREIGN PATENT DOCUMENTS

WO   WO 2006/079987 A2   8/2006

OTHER PUBLICATIONS

Wines & Vines Flash Extraction Goes to Work Feature Article from the Jan. 2011 Magazine Issue Flash Extraction Goes to Work Winemakers excited about effects on phenolics, flavor isolation by Laurie Daniel http://www.rootsrundeep.com/pdfs/Wines_and_Vines-Flash_Extraction_Goes_to_Work.pdf.*

(Continued)

*Primary Examiner* — Vera Stulii
(74) *Attorney, Agent, or Firm* — Jacques M. Dulin, Esq.; Innovation Law Group, Ltd.

(57) ABSTRACT

Multi-stage fermentation process for making red/white/rosé wines having a unique, unexpected and intense "vertical palate" (VP) of aroma, flavors and exceptional finish. The inventive VP wines are a blend of 3-4 feed stocks: I. Red: A) a primary and secondary fermented, barrel-aged must-based wine; B) a flashed-must, barrel-fermented, barrel-aged wine; C) a flashed-on-skin primary and secondary fermented, barrel-aged wine; or D) A+C; and II. White: A-1) a low solids, juice-based barrel fermented wine, and/or A-2) a low solids primary and secondary fermented, barrel or tank-aged wine; B) a flashed-juice, concentrated, barrel-fermented, barrel or tank-aged wine; C) a flashed-juice, concentrated, primary and secondary fermented, barrel or tank-aged wine; or D) A-2+C. Quantitative assays show the inventive VPP wines have 2-3× phenolic components as compared to traditional fermentation process wines. The inventive VP Process (VPP) may be applied to non-carbonated, carbonated and fortified wines, and post-processed to produce reduced-alcohol wine products.

11 Claims, 2 Drawing Sheets

(58) Field of Classification Search
USPC ........ 426/15, 592, 11, 330.4, 599, 650, 493, 426/590, 330.3, 387, 489, 490, 13, 14
See application file for complete search history.

(56) References Cited

U.S. PATENT DOCUMENTS

| | | |
|---|---|---|
| 6,203,826 B1 | 3/2001 | Calvin |
| 2005/0158798 A1 | 7/2005 | Sher |

OTHER PUBLICATIONS (Leve,J) "How Bordeaux Wine or other wine is made") The wine Cellar Insider (online), Apr. 19, 2011 (retrieved on Nov. 11, 2014). retrieved from the internet: ,>URL: https://web.archive.org/web/20110419103757/http://www.thewinecellarinsider.com/wine-topics/wine-educational-questions/how-wine-is-made/.

\* cited by examiner

VERTICAL PALATE WINE MAKING PROCESS

CROSS-REFERENCE TO RELATED, PRIORITY APPLICATION

This application is the regular US Application of U.S. Provisional Application of the same title and by the same inventor, Ser. No. 61/882,935 filed Sep. 26, 2013, priority of which is claimed pursuant to 35 USC §§ 119(e) and 120, and 37 CFR 1.78.

FIELD

The invention relates to the field of oenology, specifically improved processes or protocols for making non-sparkling red, white and rosé wine, and more particularly an integrated process involving multiple feed stocks that are blended to produce a wine product having an intense "vertical" palate (VP). The inventive VP wines are more slowly developing and ageing in the bottle than non-VP wines. The feed stocks include: I. For Red: A) a primary and secondary fermented, barrel-aged must-based wine; B) a flashed-must, barrel-fermented, barrel-aged wine; C) a flashed-on-skin primary and secondary fermented, barrel-aged wine; and D) (pre: A+C) a combined must and flashed-must, primary co-fermentation prior to secondary fermentation and barrel ageing; II. For White: A-1) a low solids, juice-based barrel fermented wine, and/or A-2) a low solids juice-based primary and secondary fermented, barrel or tank-aged wine; B) a flashed-juice, concentrated, barrel-fermented, barrel or tank-aged wine; C) a flashed-juice, concentrated, primary and secondary fermented, barrel or tank-aged wine; and D) (pre: A-2+C) a combined cold-settled and flashed-juice cold primary and secondary fermentation followed by barrel or tank ageing. The A, B, C or blended D feed stocks are selectively blended to produce the inventive vertical palate wine. Red and white may be blended for a rosé, or rosé grapes used to produce a vertical palate rosé wine in accord with the inventive protocols. A presently preferred blend is ⅓ of each feed stock. The inventive VP process may also be applied to carbonated and fortified wines or juices, and as a feed stock for post-processing to produce non- and low-alcohol wine products.

BACKGROUND

Wine making is a millennium-plus, old craft. At its most basic, traditionally wine quality grapes have been crushed to form a "must" that is pressed to extract the juice which is then fermented in two stages, a first, primary fermentation aerobic stage using yeast to convert the natural sugar in the grapes into alcohol while the resultant carbon dioxide is allowed to escape. This produces the base wine followed by a secondary, anaerobic, malolactic fermentation stage. The fermented raw wine is settled, filtered, racked or/and riddled and aged before bottling.

More recently, vacuum flashing of heated must has been used to concentrate the must before pressing or direct primary fermentation stages. The ageing may occur in barrels or tanks (vats), and various settling, clarification, filtration, fining, racking and riddling protocols may be used to remove precipitates developed during fermentation and ageing.

Sparkling wines have uniquely different flavor characteristics than non-sparkling wines, in part due to the carbonation present in the wine. There are four main methods of sparkling wine production. The first is simple injection of carbon dioxide ($CO_2$), the process used in soft drinks, but this produces big bubbles that dissipate quickly in the glass. The second is the Metodo Charmat, created by a French vine grower in Saint-Pourçain-sur-Sioule, France, in which the wine undergoes a secondary fermentation in bulk tanks, and is bottled under pressure. This method is used for Prosecco and Asti (Asti Spumonte) in particular, and produces smaller, longer-lasting bubbles. This is now used widely around the world to produce light, delicate sparkling wines. The third method is the traditional method, known as the méthode champenoise, in which the effervescence is produced by secondary fermentation in the bottle, producing a more complex wine. This method is used for the production of Champagne and other quality sparkling wines and is somewhat more expensive than the Charmat process. The fourth method is the "transfer method". This method takes the fermented first juice pressing, or cuvée, to bottle for secondary fermentation, which allows for the additional complexity. After the bottled cuvée has spent a selected amount of time with its yeast, the wine is transferred out of the individual secondary fermentation bottles into a larger tank, for subsequent bottling. The net results of these processes are wines having a unique palate sensation resulting from the presence of the varying degrees of carbonation introduced by their respective processes and the relative complexity of the wine.

Mouth feel is readily recognized as strikingly different for sparkling wines as compared to non-sparkling wines. A less recognized aspect is that sparkling wines tend to bathe the palate, again in large part due to the carbonation, and the relief of the carbonation helps spread the wine up to the palate, as distinct from resting primarily on the tongue. The result is engagement in the mouth, of taste in both the taste organs of the tongue and the sensory endings in the palate.

Accordingly, there is an unmet need in the art to develop economical processes of producing non-sparkling wines that exhibit excellent color solids and enhanced taste essences of aroma and flavor in the entire mouth, rather than being dominantly focused on the tongue, which processes fit in the current viticulture and vindication infrastructure without introducing carbonation, yet which can take advantage of the complexities and richness of non-sparkling wine structures. There is an additional unmet need to provide an economical process of producing sparkling wines and fortified wines which exhibit enhanced taste essences of aroma and flavor in the entire mouth. There is an unmet need to provide an economical process of producing low- and non-alcoholic wine products that have enhanced wine essences to counter the otherwise "thin" nature of such products.

THE INVENTION

The invention comprises a three stage process for making non-sparkling red, white and rosé wines having a unique, unexpected and intense "vertical palate" ("VP") of aroma and flavors that engage the entire mouth with exceptional finish. The inventive VP wines have won numerous awards, including gold Medals, best Wine of the Competition, and Wine of the Year, as objective assessment of quality and aroma and flavor character. The inventive VP wines are more slowly developing and will age in the bottle slower than non-VP wines, peaking later with a longer drinkable life (on the order of 50% longer), meaning the inventive VP process adds to the preservation of the wine as a result of the higher grape extraction levels of the VP process.

The inventive VP process may also be applied to carbonated and fortified wines or juices. The inventive VP wines may also be post-processed to remove alcohol to produce non-alcoholic wines (wines having residual alcohol content less than 0.5% by volume), alcohol-free wines (wines having less than 0.01% volume percent alcohol), and low or reduced alcohol content (less than 11-13% volume percent alcohol) wine.

The invention comprises an integrated process for production of multiple feed stocks that are blended to produce the inventive vertical palate, VP, wine product. The feed stocks produced in accord with the inventive integrated process include:

I. For Red, Feed Stocks:
  A. a primary and secondary fermented, barrel-aged must-based wine;
  B. a flashed-must, barrel-fermented, barrel-aged wine; and
  C. a flashed-on-skin primary and secondary fermented, barrel-aged wine; or
  D. (pre: A+C) a combined must and flashed-must, primary co-fermentation prior to secondary fermentation and barrel ageing; and II. For White, Feed Stocks:
  A. either or both of:
    1) a low solids, juice-based barrel fermented wine, and/or
    2) a low solids juice-based primary and secondary fermented, barrel or tank-aged wine;
  B. a flashed-juice, concentrated juice, barrel-fermented, barrel or tank-aged wine; and
  C. a flashed-juice, concentrated, primary and secondary fermented, barrel or tank-aged wine; or
  D. (pre: A-2+C) a combined cold-settled and flashed-juice, cold primary and secondary fermentation, followed by barrel or tank ageing.

The Feed Stocks A, B, C, and D are blended, as described below, to produce the inventive vertical palate wine. Red and white may be blended for a rosé, or rosé grapes used to produce a vertical palate rosé wine in accord with the inventive protocols.

A presently preferred blend is ⅓ of each feed stock, but a wide range of blends of the three feed stocks may be employed as desired by the wine maker. In all cases, the resulting wine may be certified as: a Reserve VPP Wine; a Reserve Cuvee VPP Wine; a Vintner's Reserve VPP Wine; a Vintner's Select VPP Wine; a Vintner's Reserve VPP Wine; or simply a VPP Wine; VPP being the abbreviation for Vertical Palate Process of this invention. Where the Feed Stock D is used, since it is a combination of Feed Stocks A and C ("pre" means prior to fermentation), the proportions of D are increased to reflect that the Feed Stock D is a combination of two feed stocks. Thus, for Red, where the blend is ⅓ of each of A, B and C, in cases where D is used, the proportion would be ⅔ D and ⅓ B. Or in the case of White, the proportion would be ⅔ D, no A-1, and ⅓ B.

In the case of the blended Feed Stock D, co-fermentation of both juice streams or musts is employed. The flash on skins extracted juice or must can be combined with the non-flash juice or must as long as the same ratio of feed stocks is followed, e.g., ⅓ each feed stock or ⅔ of a combined feed stock. Tank fermentation with the addition of new oak barrel equivalents, that is, barrel oak staves, segments, beans or chips suspended in the tank, can be substituted for barrel fermentation step where use of oak barrels is not economically feasible. Conversely, oak barrel fermentation in "neutral" oak barrels, that is, barrels that have had already 2-5 years of fermentation use and thus little or no barrel oak flavor profile, is not recommended. The oak barrels for the inventive process should be less than about 3-years of age use, or must have new oak stave inserts to provide the inventive vertical palate profile.

BRIEF DESCRIPTION OF THE DRAWINGS

The invention is described in detail by reference to the drawings, in which.

DETAILED DESCRIPTION OF THE INVENTION, INCLUDING THE BEST MODE

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures. For clarity and conciseness, the drawings show in schematic, or omit, parts and steps that are not essential in that drawing to a description of a particular feature, aspect or principle of the invention being disclosed.

Figure 1:
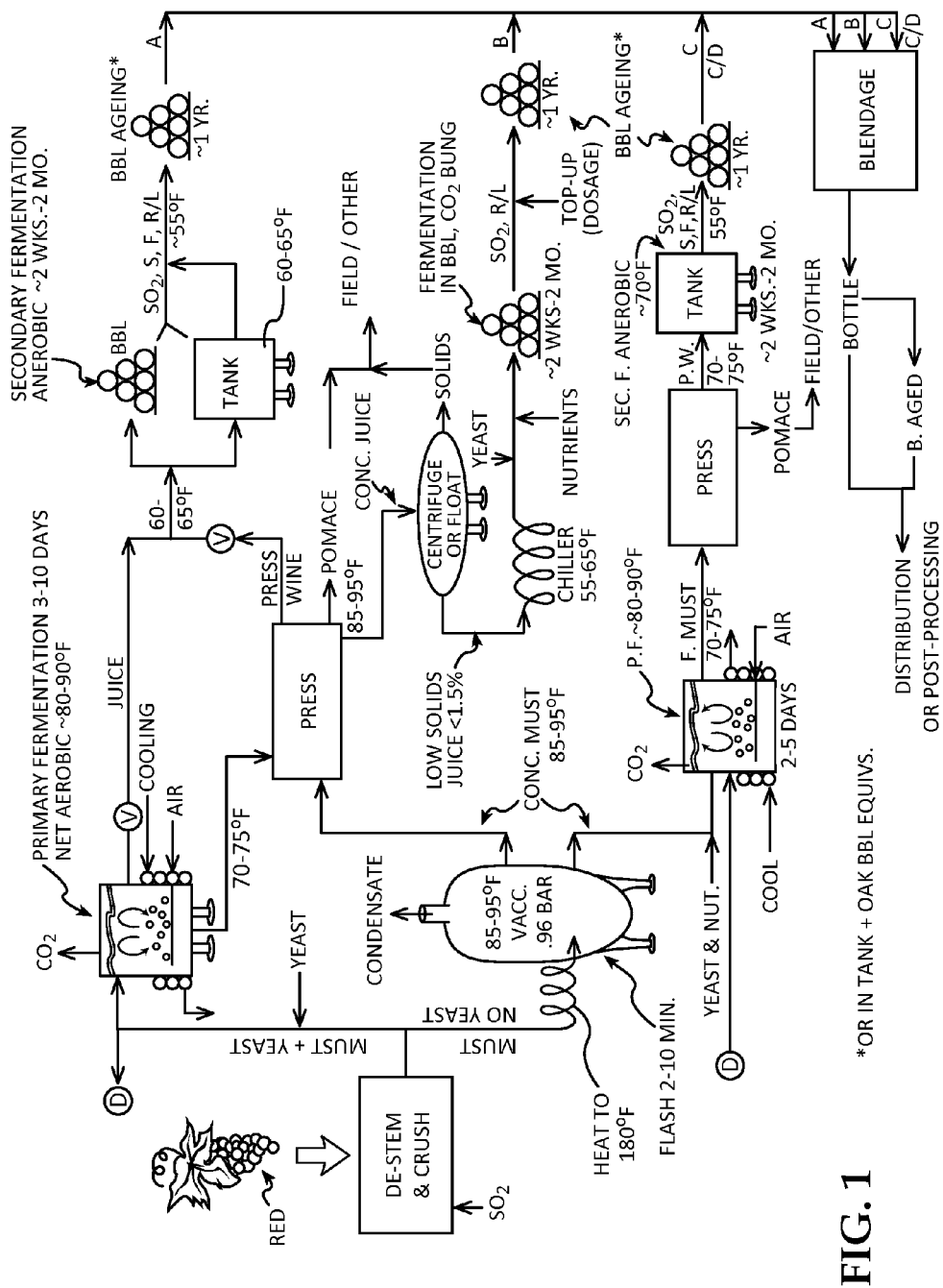
FIG. 1 is a flow sheet showing the process of producing the feed stocks for the inventive vertical palate red wine in which each process step and processing equipment has been identified.
Figure 2:
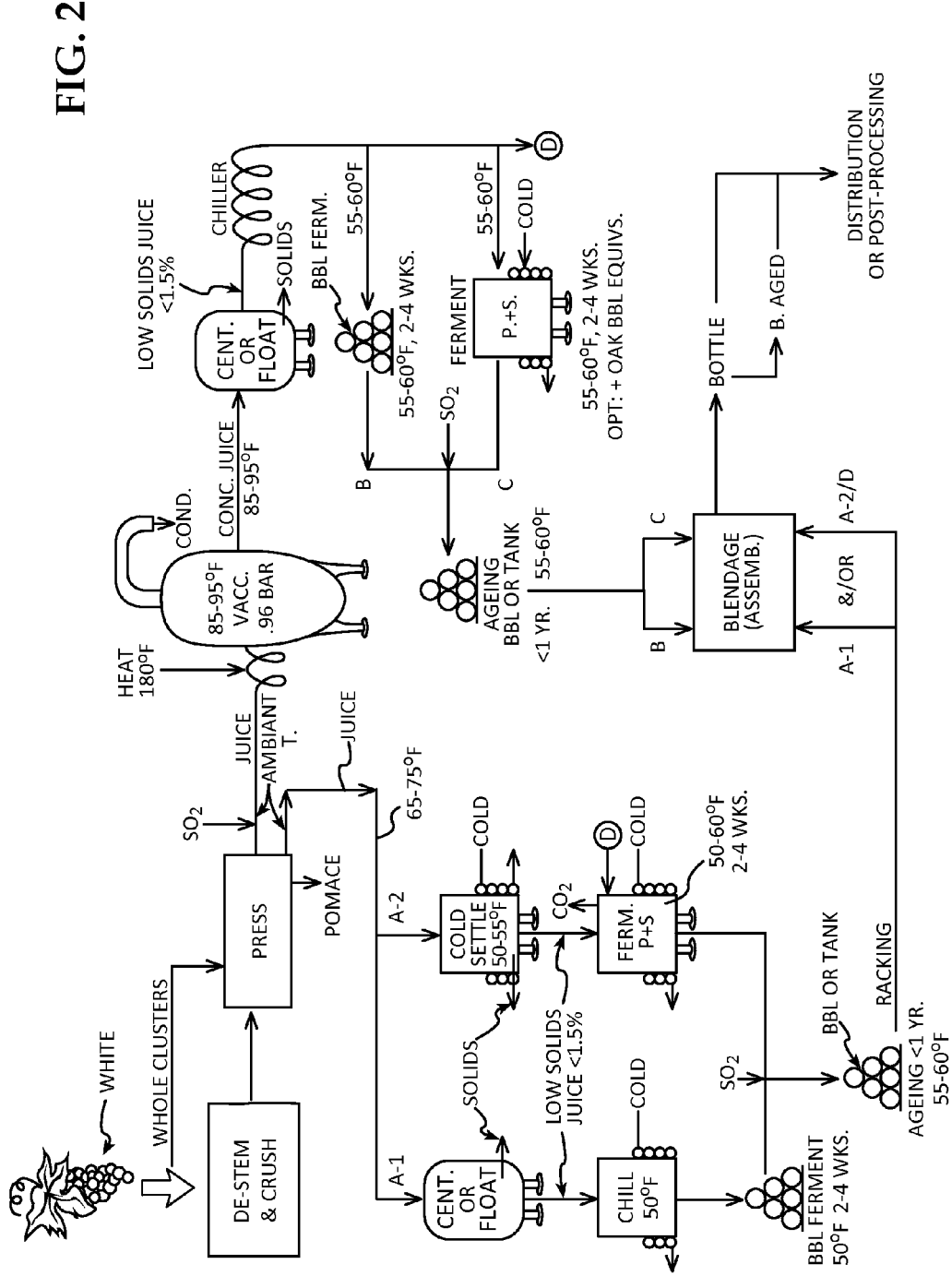
FIG. 2 is a flow sheet showing the process of producing the feed stocks for the inventive vertical palate white and rosé wines in which each process step and processing equipment has been identified.

The enabling equipment and process steps are annotated in FIGS. 1 and 2 in such detail that they are self-explanatory to one skilled in the art. Upon review, one skilled in the art of wine making will easily be able to understand the equipment, materials and method steps for production of the inventive vertical palate wine, and will be able to easily follow the steps to produce a wine having the described vertical palate process characteristics.

The following detailed description follows the flow sheets of FIG. 1, for red, and FIG. 2 for white wine, respectively. Abbreviations include: "BBL" for barrel; "VACC." for vacuum; "P.F." for primary (aerobic) fermentation; "Sec.F." for secondary (anaerobic) fermentation; "R/L" racks or racking and lees removal; "P.W." for press wine; "S" for settling; "F" for fining; "F. MUST" for fermented must; "NUT." for nutrients; "CONC." for concentrated; "BBL EQUIVS." for barrel equivalents (suspending oak staves, segments, beans or chips in the tank in contact with the wine being fermented); "T." for temperature; "CENT." for centrifuge ("OR FLOAT"); "COND." for condensate (condensed water vapor); "FERM." for ferment or fermentation; "P.+S." for primary and secondary fermentation; "OPT:" for optional; "ASSEMB." for assemblage;

With reference to FIG. 1, for the production of a red vertical palate wine, the inventive vertical palate process method steps include: For all feed stocks, selected harvested red grapes are de-stemmed and crushed to produce a must. To produce Feed Stock A, yeast is added to a portion of the must which is then subjected to primary tank aerobic fermentation over 3-10 days, at a temperature maintained by cooling in the range of from about 80° F. to about 90° F. Near the end of the fermentation the temperature drops into the 70°-75° F. range. The fermented must is withdrawn to a press, the pomace separated and the press wine, along with any optional free run press juice is subjected to secondary, anerobic (maleolactic) fermentation in oak barrels or tanks from about 2 weeks to 2 months at a temperature on the order of 60° F.-65° F. The wine is then clarified by settling, filtration, racking and lees removal, and transferred to oak barrels for barrel ageing for about 1 year at a temperature of about 55° F.

To produce red wine Feed Stock B, a second portion of the must, to which no yeast is added, is heated to in the range of about 180° F.±5° F. and subjected to vacuum evaporation in a flash tank at a temperature in the range of from about 85° F.-95° F. for from about 2-10 minutes to produce a concentrated (un-fermented) must. This flashed hot concentrated must is then sent to a press where concentrated juice is separated from the pomace. The concentrated press juice at 85° F.-95° F. is centrifuged, or processed in a float, to produce an un-fermented juice having, 1.5% solids. The low solids juice is then chilled to in the range of from about 55° F. to about 65° F., yeast and optionally nutrients are added, and transferred to oak barrels for fermentation (or to a tank in which oak barrel equivalent adjuncts have been suspended) at that temperature for from about 2 weeks to about 2 months during which the $CO_2$ developed is let exhaust. At the end of the fermentation, the oak barrels are racked, $SO_2$ added, lees removed as desired, and the barrels topped-up (dosage added), whereupon the wine is oak barrel or tank (with oak barrel equivalent adjuncts as described) aged for on the order of 1 year to produce Feed Stock B.

As to Feed Stock C, the hot concentrated must is taken from the flash tank, yeast and select nutrients (optional) added and transferred to a tank for primary fermentation for from 2-5 days at a temperature in the range of from about 80° F. to about 90° F.; the tank may be cooled as needed to maintain proper fermentation temperature. At the end of the fermentation the fermented must at about 70° F.-75° F. is pressed, the pomace discarded and the resulting recovered press wine is transferred to an anerobic tank for secondary fermentation at around 80° F. for from about 2 weeks to 2 months. The wine is then settled, filtered, racked and $SO_2$ added as needed, transferred to oak barrels for barrel ageing for on the order of 1 year. The resulting aged wine is Feed Stock C.

As to Feed Stock D, an aliquot of must, prior to going through the Feed Stock A process path, is fed into the cooled primary fermentation tank of the Feed Stock C process stream, that is the output of concentrated must out of the vacuum flash tank. The combined pre-D+C musts are then processed just as the C concentrated must is in the Feed Stock C process path.

The three, (or two, where Feed Stocks D and C are combined) aged red wine feed stocks are then blended per the wine maker's selected "blendage" (assemblage) protocol to produce the inventive vertical palate process red wine, which is bottled and distributed. The vertical palate characteristics of the end product require a blend of all three feed stocks. Unexpectedly, I have found that the surprising flavor, aroma, mouth feel and finish characteristic of a vertical palate process wine are not developed if only two of the three feed stocks are combined. While an individual wine maker may select proportions of the feed stocks to provide the notes he or she finds the most suitable for the grape varietals used in the individual feed stocks, a substantial portion of each are required. A basic blend is ⅓ of each Feed Stock, A, B and C, or ⅓ B and ⅔ D as described above.

Providing only 5-10% of any one or two of the feed stocks does not produce the maximum vertical palate characteristics.

With reference to FIG. 2, for production of a white or rosé grape vertical palate wine, the inventive process comprises selecting white or rosé grapes that are either de-stemmed and crushed, or whole clusters sent to a press to extract juice at ambient temperature. The pomace is discarded. To produce Feed Stock A-1, the ambient temperature (65° F.-75° F.) juice is centrifuged, the solids discarded (or used for other products) and the resultant low solids juice (<1.5% solids) is chilled to on the order of 50° F. and introduced into oak barrels for barrel fermentation (or into tanks with barrel equivalent oak adjuncts) at about 50° F. for from about 2-4 weeks. $SO_2$ is added to the resultant fermented wine, which is oak barrel or tank aged for on the order of a year or less at about 55° F.-60° F. to produce Feed Stock A-1.

For Feed Stock A-2, the press juice is cold settled at about 50° F.-55° F. and the low solids juice (<1.5% solids) is decanted and tank fermented, both primary and secondary, for from about 2 to about 4 weeks at 50° F.-60° F. $SO_2$ is added to the resultant fermented wine, which is oak barrel or tank aged for on the order of a year or less at about 55° F.-60° F. to produce Feed Stock A-2.

For Feed Stock B, the press juice is heated to in the range of about 180° F.±5° F. and subjected to vacuum evaporation in a flash tank at a temperature in the range of from about 85° F.-95° F. for from about 2-10 minutes to produce a concentrated (un-fermented) juice. This flashed hot concentrated juice is then centrifuged at 85° F.-95° F., or processed in a float, to produce an un-fermented low solids juice (<1.5% solids). The low solids concentrated juice is chilled to in the range of about 55° F.-60° F. and oak barrel fermented for from about 2-4 weeks at that temperature. SO2 is added to the resultant fermented wine, which is oak barrel or tank aged for on the order of a year or less at about 55° F.-60° F. to produce Feed Stock B.

For Feed Stock C, the unfermented chilled low solids concentrated juice is tank fermented (both primary and secondary) for from about 2-4 weeks at about 55° F.-60° F. SO2 is added to the resultant fermented wine, which is oak barrel or tank aged for on the order of a year or less at about 55° F.-60° F. to produce Feed Stock C.

For Feed Stock D, a portion of the chilled juice out of the centrifuge downstream of the flash evaporation tank (see description of the Feed Stock B process path, above) is diverted to be input with the Feed Stock A-2 stream out of its cold settling tank, into a cold primary and secondary fermentation tank. The resulting combined Feed Stock A-2+D is oak barrel or tank aged and blended with Feed Stock B in the proportions described above.

The three, aged white and/or rosé wine Feed Stocks A-1 and/or A-2, B and C (or two Feed Stocks D and B, where D is a combined A-2 and C Feed Stock) are then blended per the wine makers selected blendage (assemblage) protocol to produce the inventive vertical palate process white or rosé wine, which is bottled and distributed. The vertical palate characteristics of the end product require a blend of all three feed stocks. Unexpectedly, I have found that the surprising flavor, aroma, mouth feel and finish characteristic of a vertical palate process wine are not developed if only two of the three feed stocks are combined. While an individual wine maker may select proportions of the feed stocks to provide the notes he or she finds the most suitable for the grape varietals used in the individual feed stocks, a substantial portion of each are required. A basic blend is ⅓ of each feed stock, in this case ⅓ each A-1 and/or A-2, with ⅓ B and ⅓ C, or ⅓ B and ⅔ D as described above. Providing only 5-10% of any one or two of the feed stocks does not produce the maximum vertical palate characteristics. Uniquely, the vertical palate for the white and rosé wines in accord with the inventive process is similar in finish to champagne, but without the carbonation.

Where a rosé is produced by a blend of red and white, both those components must be vertical palate process wines in order for the resultant rosé blend to have the vertical palate wine characteristics.

Where one or more of the Feed Stocks A, A-1, A-2, B, C or D are carbonated, the resultant VP wines have an even greater expression of taste essences of aroma and flavor in the entire mouth, including a broader range of taste as well as intensity and duration. The same is true for fortified wines or juices, such as Pineau des Charentes, port, spirits-infused grape juice. Thus the inventive VPP process is applicable to wine products having elevated levels of alcohol or carbonation above the table wine baseline normal range.

In the examples below all of the competition awards (Gold, Double Gold), the points awarded by the tasting panel magazine and by Cellar Masters, were judged by professional wine judges in blind competitions, so that the wine qualities were directly compared.

Example 1

20 tons of old vine Zinfandel grapes from the Lodi, Calif. area were processed in accord with the inventive VP process for red wines described and illustrated with reference to FIG. 1. The resulting vintage VP Zinfandel wine won Wine of the Year at the Indy International Wine Competition July 30-Aug. 1, 2014 at Purdue University, West Lafayette, Ind. Wines from 40 states and 11 countries as far away as France, Australia, Spain and Greece were judged by 45 professional wine judges on appearance, aroma, taste and aftertaste by 45 international judges, and the inventive VP zinfandel bested over 2200 wines in that competition.

Example 2

20 tons of old vine Zinfandel grapes from the Lodi, Calif. area of a different growth year than that of Example 1, were also processed in accord with the inventive VP process for red wines described and illustrated with reference to FIG. 1. In 2014, the resulting vintage VP Zinfandel wine won the Double Gold at the American Fine Wine Competition, a Gold medal at the San Francisco Chronicle Wine Competition, and a Double Gold at the Florida State Fair Wine Competition. It also received a rating of 92 points from Wilfred Wong, BevMo's Cellar Master.

Example 3

20 tons of old vine Zinfandel grapes, from a different California vineyard, also in the Lodi area, of the same growth year as Example 2, were also processed in accord with the inventive VP process for red wines described and illustrated with reference to FIG. 1. The resulting vintage VP Zinfandel wine won Gold medals in 2014 at the Pacific Rim Wine Competition, Grand Harvest Awards competition, American Wine Society Int'l Wine Competition, Indy International Wine Competition, Florida State Fair Wine Competition, Monterey Wine Festival, and the Consumer Wine Awards. It also received a rating of 94 points from Wilfred Wong, BevMo's Cellar Master.

Examples 1 and 2 Zinfandel wines have been described by winemakers from the area as the "Quintessential Lodi Zin". The zins from this winery are described as revealing "remarkably little heat considering the 15.8% alcohol", and the wine is "smooth and soft with lots of rich dark fruit and spice". It has "lots of rich flavors, vanilla and caramel" with "some oaky note flow into the long finish."

Example 4

20 tons of Syrah grapes were processed in accord with the inventive VP process for red wines described and illustrated with reference to FIG. 1. The resulting vintage VP Syrah wine won Gold medals in 2014 at the Armenti Del Vino Int'l Wine Competition, the Pacific Rim Wine Compeition, the Monterey Wine Festival, and the San Francisco International Wine Competition.

Example 5

20 tons of Syrah grapes from a different vintage were processed in accord with the inventive VP process for red wines described and illustrated with reference to FIG. 1. In 2013, the resulting vintage VP Syrah wine won both Double Gold and Best Red Wine of Show at the American Wine Society Int'l Wine Competition, and Gold medals in 2014 at the Indy International Wine Competition, the San Francisco Chronicle Wine Competition and the Dallas Morning News & TEXSOM Wine Compeition.

Example 6

20 tons of Petite Syrah grapes were processed in accord with the inventive VP process for red wines described and illustrated with reference to FIG. 1. In 2013, the resulting vintage VP Petite Syrah wine won Double Gold at the Indy International Wine Competition, and Gold medals at the American Wine Society Int'l Wine Competition, and 2014 Monterey Wine Festival. It also received a rating of 93 points from Wilfred Wong, BevMo's Cellar Master.

Example 7

20 tons of Cabernet grapes from California were processed in accord with the inventive VP process for red wines described and illustrated with reference to FIG. 1. In 2014 the resulting VP Cabernet wine received a rating of 90 points from a wine magazine, the tasting panel.

Example 8

20 tons of Napa Valley Calif. Cabernet Sauvignon grapes were process in accord with the inventive VP process for red wines described and illustrated with reference to FIG. 1. In 2014, the resulting VP Cabernet, assaying 14.7% abv (alcohol by volume), was awarded 94 points as one of the Publisher's Picks, by wine magazine the tasting panel. This VP Cabernet is described as having "bold tones of chocolate, cherry and blackberry". Its "plumy, gritty tannins are spice-edged with a toasty backdrop."

Example 9

20 tons of Napa Calif. Chardonnay grapes were processed in accord with the inventive VP process for white wines described and illustrated with reference to FIG. 2. In pre-- bottling sampling, the winemaker states that this VP Chardonnay wine expresses the enhanced characteristics described herein for a VP process wine. Since it is, at this writing, just being bottled, it has not yet been entered in competition. It is expected to garner significant awards, just as have the reds of Examples 1-8.

salivary proteins, free $SO_2$ and ferric chloride, namely: 1) the pH behavior of anthocyanins in solution in the acidic region; 2) the ability of a solution of potassium metabisulfite to bleach anthocyanins; 3) the capability of proteins to form complexes with tannins and precipitate from solution; and 4) the reactivity of ferric chloride with phenolic compounds that possess vicinal dihydroxyl groups.

TABLE 1

Comparative Wine X-Ray Results

| Sample # | Sample ID | Vintage | Varietal | tANT | fANT | bANT | pTAN | IRPs |
|---|---|---|---|---|---|---|---|---|
| 1 VP | BLA | 2012 | Cabernet Sauvignon | 451 | 283 | 178 | 1078 | 2180 |
| 2 VP | BBR | 2011 | Cabernet Sauvignon | 640 | 441 | 196 | 1942 | 3531 |
| 3 VP | BCN | 2011 | Cabernet Sauvignon | 669 | 340 | 260 | 3288 | 5498 |
| 4 VP | BCL | 2011 | Cabernet Sauvignon | 785 | 409 | 267 | 4813 | 7339 |
| 5 NVP | 12CSPR(2) | 2012 | Cabernet Sauvignon | 483 | 354 | 111 | 607 | 1507 |
| 6 NVP | 12CS21L(2) | 2012 | Cabernet Sauvignon | 568 | 419 | 135 | 874 | 1903 |
| 7 NVP | 12CS21L | 2012 | Cabernet Sauvignon | 564 | 446 | 112 | 779 | 1793 |
| 8 NVP | 12MB3S | 2012 | Malbec | 780 | 707 | 104 | 716 | 1902 |
| 9 NVP | 12MB3D | 2012 | Malbec | 799 | 759 | 82 | 582 | 1785 |

Notes:
All samples were CA appellations, Nos 1-3 St. Helena; No 4 Red Hills, and Nos 5-9 Paso Robles West.

Comparative Phenolics Assays:

To quantitatively show the significant differences between a VP wine produced by the inventive process and traditional, non-VP-process wines, sample wines were subjected to UV-Visible Spectrum spectrophotometric anaysis. Virtually all of the key compounds that make up the unique character of various red wines are due mainly to the concentrations of phenolic compounds.

To quantitatively measure the phenolic material in the wine, the Harbertson-Adams Assay ("HA Assay"), was used. The HA Assay is an industry-accepted assay that matches the sensory perception of wine qualities with the quantities of phenolic components present in the wine, including phenolics that precipitate with salivary proteins and the total amount of phenolic components present in the wine. The salivary proteins react with many different molecular weight wine tannins and polymeric pigments. Phenolic compounds eliciting such reactions, like dimeric flavonoids, characteristically have molecular weights ranging from about 500 to about 5,000. In young wines, tannins exist as dimmers or trimers, but with further polymerization with age, the tannins are present with 8-14 flavonoid units with moledular weights ranging from about 2,000 to about 4,000. To measure the total amount of phenolic material in the wine sample, the HA Assay uses ferric chloride to bind the wine sample's phenolic components since ferric chloride does not bind to the polymeric pigments, nor the anthocyanins in the wine. The In developing the HA Assay, spectrophotometric values were compared to some 7500 fundamental wet chemistry data to prove reliability of the HA Assay model. The resulting wet-chemistry-based spectrophotometric analytical system is proprietary to Wine X Ray of Napa Calif. which performed the tests reported here.

In Table 1 below: "tANT" is the measure of Total Anthocyanins; "fANT" is Free Anthocyanins; "bANT" is Bound Anthocyanins; "pTAN" is Protein-Precipitable Tannins; and "IRPs" is Total (iron reactive) Phenolics". The HA Assay relies on four fundamental characteristics of the behavior of wine phenolic compounds when they come into contact with Discussion:

Samples 1-4 are VP wines produced in accord with the with the inventive VP process for red wines described and illustrated with reference to FIG. 1. All were bottled in 2014 and assayed in 2014 per the HA Assay protocol described above. As compared to non-VP, traditional process wine ("NVP") of samples 5-7 for the same grape variety and similar terraines, the values for bANT, pTAN and IRPs are substantially higher, particularly the 2011 vintage wines. The tANT and fANT are within comparable ranges. The values for the VP wine samples' IRPs (Samples #s 1-4) are on the order of double to triple those for the comparative NVP wine samples (Samples #s 5-7). NVP samples 8 and 9 are of a different grape variety, a Malbec, and those values are similar to the NVP cabernet sauvignon samples 5-7. The substantial quantitative increases in phenolic components of the VP process wine of this invention shown in Table 1 are strong evidence of the distinctive difference in kind of the inventive VP Process wine (VPP) as compared to traditional wine fermentation processes.

Another advantage of the inventive VPP process is that VPP wines, by spectroscopic analysis shown in Table 1, exhibit significantly greater wine phenolic components than traditionally produced wines. As a result, VPP wines will be more slowly developing and ageing in the bottle. As a result, VPP wines are expected to age out much longer than traditionally produced wines, and additional 50% life being projected. Stated another way, the inventive VPP process adds to the preservation of maturing wine characteristics.

Post-VVP Wine Product Processing:

The inventive VVP wine products may be post-processed, such as by double reverse osmosis de-alcoholization, to produce a non-alcoholic wine or low-alcoholic wine with enhanced taste essences of aroma and flavor. A serious problem with low or non-alcoholic wines is that they have a mouth feel and taste of "watery-ness" as a result of removal of alcohol, and replacement with quantitative aliquots of water. As a result of the VPP process of the pre-de-alcoholization steps providing elevated levels of wine flavor compounds, those elevated levels carry through the alcohol removal steps to produce an enhanced flavor low- and non-alcohol wine product. An enabling de-alcoholization process which may be used with a VPP-wine feed stock is described in my prior patents: U.S. Pat. No. 4,888,189 (1989) and U.S. Pat. No. 4,999,209 (1991).

A skilled wine maker will readily recognize that a wide range of process variations may be selectively included within the scope of the inventive vertical palate process, including, by way of example: wine grape selection; balance of clusters vs crush fed to the press; operating temperatures at the several stages; press forces (gentle, moderate or heavy); extent of vacuum filtration; mix of free run juice with press juice or press wine; length of fermentation; tank vs barrel fermentation; barrel types; amount of solids; yeast types, amounts and points of introduction; nutrients or flavorants introduced; dosage and top-up components; points in the process for introduction of $SO_2$ and amounts; and the selection of clarification processes including settling, centrifugation, filtration, racking, lees removal vs fermentation or ageing on lees, and the like.

INDUSTRIAL APPLICABILITY

It is clear that the inventive vertical palate wine process, and the vertical palate wine products produced by that process, have wide applicability to the wine industry, namely to production of red, white and rosé wines, particularly non-sparkling wines, having unique, unexpected and intense "vertical palates" of aroma and flavors that engage the entire mouth with exceptional finish. The wines resulting from the inventive process include a new class of non-sparkling wines that rival the sparkling wines for mouth feel, flavor, aroma and finish, and have notes not expressed in sparkling wines.

It should be understood that various modifications within the scope of this invention can be made by one of ordinary skill in the art without departing from the spirit thereof and without undue experimentation.

The invention claimed is:

1. A multi-stage fermentation process for producing red/white/rosé wines having a unique, unexpected and intense "vertical palate" (VP) of aroma, flavors and exceptional finish, consisting of the steps of:
   a) producing a plurality of fermented feed-stock wines from selected red, white and/or rose grape varietals, said feed-stock wines comprising:
      i) for red wines, providing selected red grape varietals to produce:
         1) a primary and secondary fermented, barrel-aged non-flashed must-based wine to form feed-stock wine red-A;
         2) a flashed-juice, barrel-fermented, barrel-aged wine to form feed-stock wine red-B;
         3) a flashed-on-skin primary and secondary fermented, barrel-aged wine to form feed-stock wine red-C; and
         4) a combination of non-flashed must, plus flashed-on-skin, primary and secondary fermented, barrel-aged wine to form feed-stock wine red-C/D; and
      ii) for white and rosé wines, providing selected white and rosé grape varietals to produce:
         1) a non-flashed, <1.5% solids, juice-based barrel fermented, barrel or tank-aged wine to form a feed-stock wine white/rosé-A-1;
         2) a non-flashed, <1.5% solids, juice-based primary and secondary fermented, barrel or tank-aged wine to form feed-stock wine white/rosé-A-2;
         3) a flashed, concentrated, <1.5% solids juice, barrel-fermented, barrel or tank-aged wine to form feed-stock wine white/rosé-B;
         4) a flashed, concentrated, primary and secondary fermented, barrel or tank-aged wine to form feed-stock wine white/rosé-C; and
         5) a combination of non-flashed, <1.5% solids juice, plus flashed, concentrated, <1.5% juice, that are together primary and secondary fermented, to produce barrel or tank-aged wine to form feed-stock wine white/rosé-D;
   b) selectively blending said red feed-stock wines A, B, C, C/D, wherein at least ⅔ is a flashed wine selected from a flashed juice wine and a flashed-on-skin wine and ⅓ is a non-flashed must-based wine, and selectively blending said white/rosé wine feed-stocks A-1, A-2, B, C, D, wherein at least ⅔ is a flashed wine and ⅓ is a non-flashed wine, or a blend of said red and white/rosé feed-stock wines, to produce a blended red, white or rosé VP wine product for bottling; and
   c) said VP wine product exhibits an intense "vertical palate" of aroma and flavors, including quantitatively increased amounts of fermentation-produced phenolic components as compared to non-VP process wine, that engage the entire mouth with exceptional finish.

2. A multi-stage fermentation process for producing a red VP wine as in claim 1 wherein said feed-stock wines for blending to form a red VP wine product are selected from at least three of feed-stock wines red-A, red-B, red-C and red-C/D.

3. A multi-stage fermentation process for producing white/rosé VP wine as in claim 1 wherein said feed-stocks for blending to form a white/rosé VP wine product are selected from at least three of feed-stocks white/rosé-A-1, white/rosé-A-2, white/rosé-B, white/rosé-C and white/rosé-D.

4. A multi-stage fermentation process for producing a rosé VP wine as in claim 3 wherein the grape varietal processed to produce said fermented feed-stocks is a rosé grape varietal.

5. A multi-stage fermentation process for producing red/white/rosé VP wines as in claim 1, wherein said VP wine is selected from a non-carbonated wine, a carbonated wine, and a fortified wine.

6. A multi-stage fermentation process for producing red/white/rosé VP wines as in claim 5, which includes the added step of processing said VP wine product to remove at least a portion of its alcohol content to produce a wine product selected from a reduced-alcohol wine, a low-alcohol wine and a non-alcoholic wine.

7. A multi-stage fermentation process for producing rosé VP wines as in claim 1 which comprises blending a red VP wine product with a white VP wine product.

8. A multi-stage fermentation process for producing red VP wines as in claim 1 wherein the blend of feed-stock wines red-A with red-B and red-C is approximately ⅓ of each said feed-stock wine.

9. A multi-stage fermentation process for producing white/rosé VP wines as in claim 1 wherein the blend of feed-stock wines white/rosé-A-1 and/or white/rosé-A-2 with white/rosé-B and white/rosé-C is approximately ⅓ of each feed stock wine.

10. A multi-stage fermentation process for producing red/white/rosé VP wines as in claim 1 wherein the blend of feed stock wines is approximately ⅓ red-B or ⅔ white/rosé-B, with ⅓ red-C/D or ⅓ a blend of white/rosé-A2 with white/rosé-D.

11. A multi-stage fermentation process for producing red/white/rosé VP wines as in claim 1 wherein fermentation occurs in presence of new barrel oak equivalents, selected from barrel oak staves, segments, beans or chips suspended in a fermentation tank, or fermentation occurs in oak barrels of less than about 3-years of age use or have new stave inserts.

* * * * *